Jan. 17, 1950  D. BUMSTEAD, JR  2,494,608
FURNACE

Filed Aug. 1, 1945  3 Sheets-Sheet 2

Inventor
DALE BUMSTEAD, JR.
By Albert G. Blodgett
Attorney

Jan. 17, 1950     D. BUMSTEAD, JR     2,494,608
FURNACE
Filed Aug. 1, 1945     3 Sheets-Sheet 3

Inventor
DALE BUMSTEAD, JR.
By Albert G. Blodgett
Attorney

Patented Jan. 17, 1950

2,494,608

UNITED STATES PATENT OFFICE 2,494,608

FURNACE

Dale Bumstead, Jr., Seattle, Wash.

Application August 1, 1945, Serial No. 608,207

4 Claims. (Cl. 122—240)

1

This invention relates to furnaces, and more particularly to steam generator furnaces of the multiple type capable of burning fuels of widely different combustion characteristics.

In many industrial plants certain combustion waste products result from the manufacturing operations, and for economic reasons it is desirable to burn these products and utilize the heat of combustion for the generation of steam. As an example, wood-working plants produce a considerable quantity of bark, sawdust, shavings and waste pieces which should be burned. However, this waste material is ordinarily insufficient in amount to produce all the steam needed, and it is necessary to burn in addition some high grade fuel, such as oil or pulverized coal. It has been proposed heretofore to provide a main furnace for the combustion of the high grade fuel in suspension, and an auxiliary furnace for the combustion of the waste material in a fuel bed, these furnaces being so combined that the hot gases from the auxiliary furnace will flow into the main furnace.

In order to obtain proper mixing of the gases as they leave the auxiliary furnace and ensure complete combustion of these gases before they encounter the boiler heating surfaces, it has been heretofore found necessary to form the roof of the auxiliary furnace with a drop nose arch arranged to deflect the gases downwardly. Such arches have proven to be subject to very rapid deterioration under the conditions encountered in service. Attempts have been made to prolong the life of the arch nose by providing a screen of water tubes between the two furnaces. However, such a screen tends to chill the auxiliary furnace undesirably, particularly when the waste fuel only is being burned, and it tends to cool the hot gases from the auxiliary furnace before their combustion is completed.

It is accordingly one object of the invention to provide a simple and effective construction which will ensure adequate mixing of the gases leaving the auxiliary furnace without the need for a drop nose arch or a water tube screen.

It has been the common practice to construct the roof of the auxiliary furnace with refractory blocks suspended from metal hangers. Since the metal parts must be air cooled to prevent them from being destroyed by the heat, it is not practical to insulate such a roof. Consequently there is a considerable heat loss through the roof, and operators who are compelled at times to stand upon or above the roof are extremely uncomfortable.

2

It is accordingly a further object of the invention to provide an improved water cooled roof construction for the auxiliary furnace, which can be effectively insulated to minimize the loss of heat therethrough.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a longitudinal section through a steam generator installation with multiple furnaces, the section being taken on the line 1—1 of Fig. 2;

Figure 1:
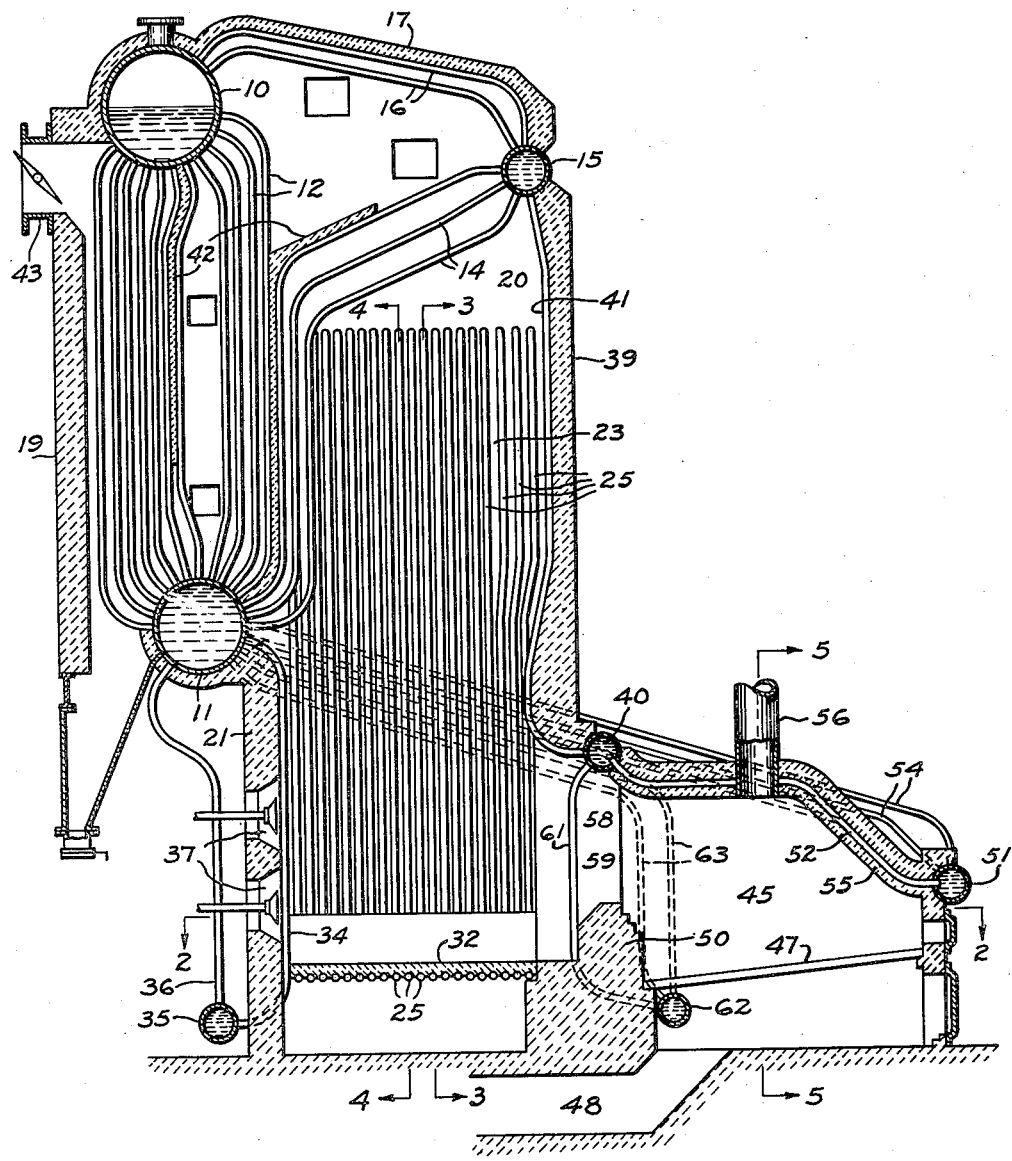

The embodiment illustrated comprises an upper transverse steam-and-water drum 10 and a lower transverse water drum 11 therebeneath, these drums being connected by a bank of upright water tubes 12. From the front of the lower drum 11 a bank of water tubes 14 extends upwardly, these tubes being generally L-shaped, with upright lower portions located in front of the tubes 12 and with upper portions which slope slightly upwardly and forwardly to a front transverse header or small drum 15. This header 15 is connected to the steam-and-water drum 10 by water tubes 16, these tubes forming a support for a roof 17 of refractory material.

Figure 4:
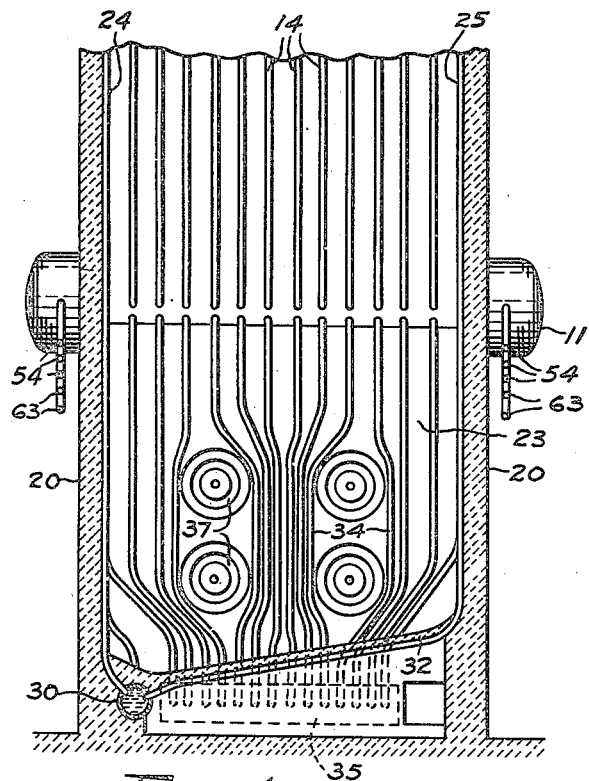
Fig. 4 is a section on the line 4—4 of Fig. 1.

A wall 19 is provided in the rear of the tube bank 12, and two walls 20 extend forwardly from the rear wall 19 on opposite sides of the water tubes to a transverse vertical plane located adjacent to the front header 15. A transverse bridge wall 21 is located in front of and beneath the lower water drum 11. The space 23 in front of the water tubes 14 and between the forward portions of the side walls 20 is utilized as a main furnace or combustion chamber of considerable height and large volume, in which a comparatively high grade fuel is burned in suspension. The walls 20 on opposite sides of the furnace 23 are lined with closely spaced upright water wall tubes 24 and 25 respectively which are preferably fully exposed to the combustion flame and adapted to absorb radiant heat therefrom at a high rate. The upper ends of the water wall tubes are connected to the steam-and-water drum 10 by means of suitable upcomers (not shown). The lower ends of the water wall tubes 24 are connected to a longitudinally extending header 30 which is supplied with water from the drum 11 by means of suitable downcomers (not shown). The lower portions of the water wall tubes 25 are bent laterally and extend across the bottom of the furnace 23 to connect with the header 30, these transversely extending portions of the tubes serving to support refractory material 32 which forms a floor for the combustion chamber. The bridge wall 21 is protected by means of upright water wall tubes 34 which are connected at their upper ends to the drum 11 and at their lower ends to a transverse horizontal header 35, this header being supplied with water from the drum 11 by means of downcomer tubes 36. A suitable fuel, such as oil, is supplied through burner openings 37 in the bridge wall 21, the tubes 34 being bent laterally to avoid interference with these openings, as shown in Fig. 4. The front portions of the two side walls 20 are connected by an upright wall 39 (Fig. 1) which forms the front wall of the main combustion chamber 23. The lower edge of this wall 39 is located a distance of several feet above the combustion chamber floor 32, and adjacent this lower edge there is provided a transverse header 40 from which water wall tubes 41 extend upwardly along the heat exposed rear surface of the wall to the header 15. Suitable baffles 42 are arranged to direct the hot gaseous products of combustion from the furnace 23 into proper contact with the water tubes 14 and 12, and thence to a gas outlet duct 43 located near the upper drum 10.

Figure 2:
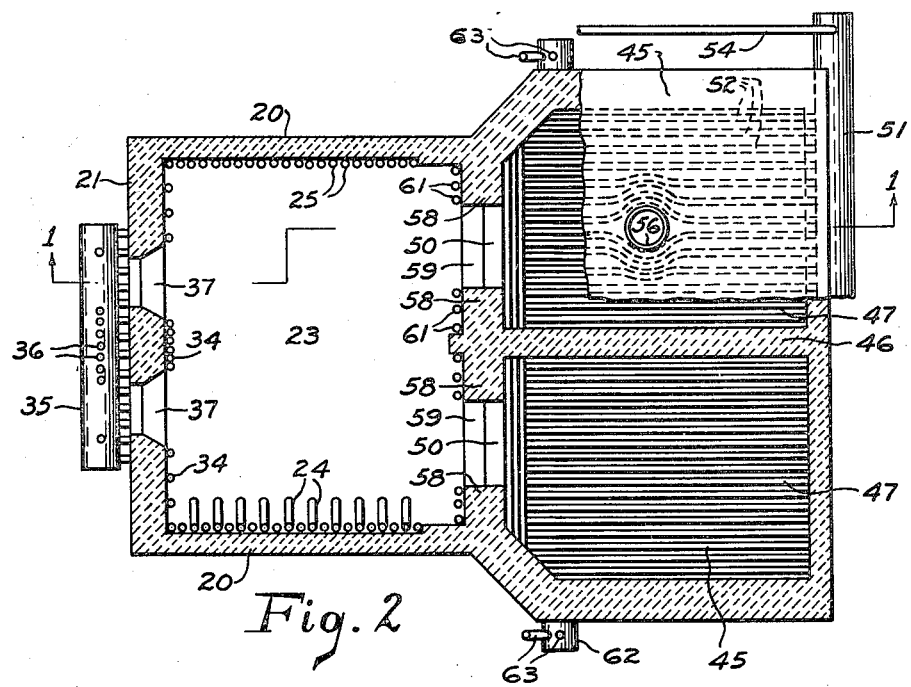
Fig. 2 is a section on the line 2—2 of Fig. 1, with a portion of one auxiliary furnace shown in full.
Figure 3:
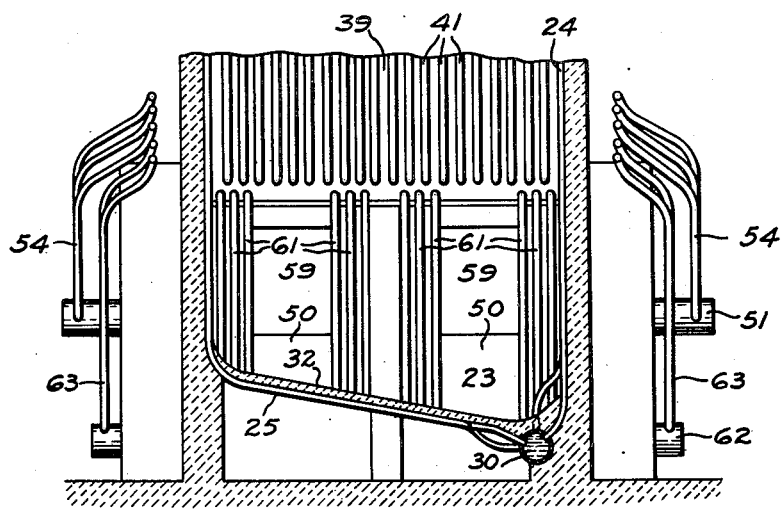
Fig. 3 is a section on the line 3—3 of Fig. 1.

In front of the lower portion of the main furnace 23 there are provided two relatively low auxiliary furnaces 45 arranged side by side and separated by a battery wall 46. The furnaces 45 are adapted for the combustion of a mass of low grade fuel in the form of waste material such as bark, sawdust, shavings or small pieces of wood, and particularly waste combustible material containing relatively high percentages of moisture. Each auxiliary furnace is provided with a grate 47 to support the burning fuel and with a duct 48 (Fig. 1) through which air for combustion is supplied beneath the grate. At the rear of the grate there is located a comparatively low bridge wall 50 over which the hot gases travel from the auxiliary furnace into the main furnace. Adjacent the front of the auxiliary furnaces there is provided a transverse header 51 from which a row of water tubes 52 extends upwardly and rearwardly to the header 40. Water is supplied directly from the lower boiler drum 11 to both ends of the front header 51 by means of downcomer tubes 54. The water tubes 52 serve to support refractory material 55 which provides a roof for each auxiliary furnace and shields the water tubes from the heat within the auxiliary furnaces. The grates 47 are supplied with fuel through vertical spouts 56 which extend through the roofs 55, certain of the water tubes 52 being bent laterally to clear these spouts, as indicated in Fig. 2.

The water tubes 52 which support the roofs 55 are free from downwardly and rearwardly sloping portions which would tend to produce steam locking and otherwise interfere with steam circulation and proper drainage of water when required.

Furthermore, there is no drop nose arch at the rear of the roof, as has heretofore been provided to obtain proper mixing of the gases. In accordance with the present invention, this mixing is effected by means of deflecting walls 58 which extend laterally from opposing directions across the path of the gases issuing from each auxiliary furnace into the main furnace, as shown particularly in Fig. 2. Each wall 58 is subjected on one side to the heat within the main furnace and on its opposite side to the heat within the auxiliary furnace. This construction provides a restricted outlet opening 59 above the bridge wall 50 of each furnace 45. These deflecting walls 58 are preferably formed of refractory material, and in order to protect them from the destructive effect of the combustion in the main furnace 23 their rear surfaces are lined with upright water wall tubes 61. The lower ends of these tubes are connected to a transverse header 62 located in front of the bridge wall 50 and beneath the grates 47, and their upper ends are connected to the header 40. Water is supplied directly from the lower boiler drum 11 to both ends of the lower header 62 by means of downcomer tubes 63.

It will now be apparent that in the operation of the invention the hot gases leaving the auxiliary furnaces will be deflected laterally by the walls 58 and thoroughly mixed as they pass through the openings 59 into the main furnace. Thus efficient combustion will be ensured. The water tubes 52 will protect the roofs 55 and greatly decrease the cost of maintenance. The water circulation through these tubes is positive and unidirectional. The furnace roofs can be adequately insulated, increasing the efficiency and rendering the surroundings more comfortable for the operators. The walls 58 are protected from the heat of combustion in the main furnace by the water tubes 61, and yet these tubes will not cool the auxiliary furnaces or the gases issuing therefrom, since the walls 58 shield the tubes from the heat within the auxiliary furnaces. Hence these furnaces can operate at the high temperatures necessary for proper ignition and combustion of the waste material delivered through the spouts 56, and this is true whether or not fuel is being supplied through the burner openings 37. Moreover, the construction of the auxiliary furnaces is such that they can be shut down without danger from the heat of the oil burning in the main furnace 23, since the deflecting walls 58 form effective shields against radiant heat, and the roofs 55 are cooled by the water tubes 52. It will be noted that when the auxiliary furnaces are shut down there will still be adequate water circulation through the roof tubes 52, because of the "pull" exerted by the front water wall tubes 41 in the main furnace.

Figure 6:
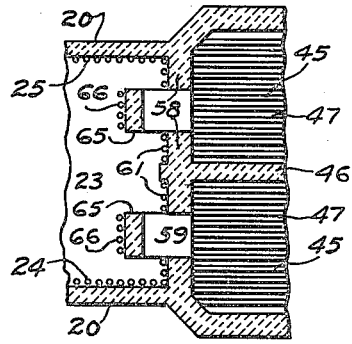
Fig. 6 is a fragmentary view similar to a portion of Fig. 2, but showing a somewhat modified construction.
Figure 7:
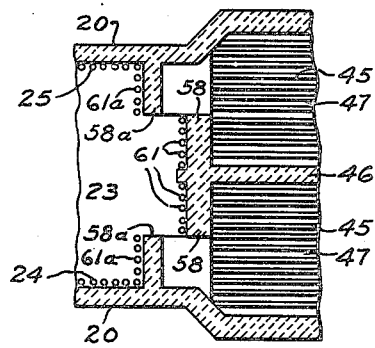
Fig. 7 is a view similar to Fig. 6 and showing a further modification.
Figure 5:
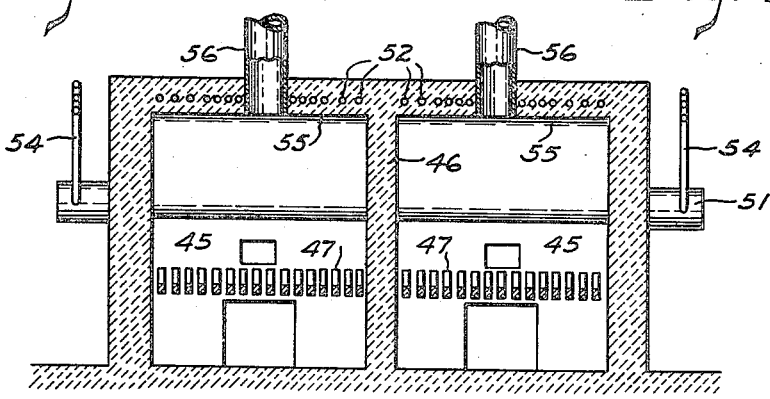
Fig. 5 is a section on the line 5—5 of Fig. 1.

In some installations it may be desirable to provide even more effective shielding of the auxiliary furnaces from the heat in the main combustion chamber. For this purpose, as shown in Fig. 6, an additional wall 65 may be placed directly in the rear of each opening 59. The rear face of this wall may be protected by upright water wall tubes 66 which, it will be understood, can be connected to the headers 40 and 62 in the same manner as the tubes 61. A further modification is shown in Fig. 7, in which the outer deflecting walls 58a are located further to the rear than the inner walls 58 and made somewhat wider to increase the shielding effect. These walls 58a are protected on their rear faces by upright water wall tubes 61a, which are connected to the headers 40 and 62. The arrangement shown in Figs. 6 and 7 have a further advantage in that the area of the passages for flow of gases out of the auxiliary furnaces can be altered by simply changing the thickness of the refractory walls 65 or 58a and without any change in the various water tubes.

Having thus described by invention, what I claim as new and desire to secure by Letters Patent is:

1. A multiple furnace installation comprising a main furnace of considerable height arranged for the combustion of a high grade fuel in suspension, a relatively low auxiliary furnace having its wall connected to the lower portions of the walls of the main furnace and arranged for the combustion of a mass of low grade fuel, the auxiliary furnace having an outlet opening through which hot gases flow directly into the lower portion of the main furnace, a bridge wall located between the two furnaces and forming the lower margin of the outlet opening, a roof for the auxiliary furnace having a portion which forms the upper margin of the outlet opening and slopes upwardly toward the main furnace so that the gases will flow upwardly as they enter the main furnace, an additional wall located adjacent the bridge wall and extending laterally between the two furnaces from one side wall of the auxiliary furnace toward the other side wall thereof to form one lateral margin of the outlet opening, the laterally extending wall being subjected on one side to the heat within the main furnace and on its opposite side to the heat within the auxiliary furnace, and upright water tubes associated with the laterally extending wall and located adjacent the main furnace side of said wall to cool the same and shielded thereby from the heat within the auxiliary furnace.

2. A multiple furnace installation comprising a main furnace of considerable height arranged for the combustion of a high grade fuel in suspension, a relatively low auxiliary furnace having its walls connected to the lower portions of the walls of the main furnace and arranged for the combustion of a mass of low grade fuel, the auxiliary furnace having an outlet opening through which hot gases flow directly into the lower portion of the main furnace, a bridge wall located between the two furnaces and forming the lower margin of the outlet opening, a roof for the auxiliary furnace having a portion which forms the upper margin of the outlet opening and slopes upwardly toward the main furnace so that the gases will flow upwardly as they enter the main furnace, two additional walls located adjacent the bridge wall and extending laterally between the two furnaces from the respective side walls of the auxiliary furnace toward one another to form the two lateral margins of the outlet opening, each of the laterally extending walls being subjected on one side to the heat within the main furnace and on its opposite side to the heat within the auxiliary furnace, and upright water tubes associated with each of the laterally extending walls and located adjacent the main furnace side of said wall to cool the same and shielded thereby from the heat within the auxiliary furnace.

3. A multiple furnace installation comprising a main furnace of considerable height arranged for the combustion of a high grade fuel in suspension, two relatively low auxiliary furnaces having their walls connected to the lower portions of the walls of the main furnace and each arranged for the combustion of a mass of low grade fuel, each auxiliary furnace having an outlet opening through which hot gases flow directly into the lower portion of the main furnace, a battery wall separating the two auxiliary furnaces, a bridge wall located between each auxiliary furnace and the main furnace and forming the lower margin of the corresponding outlet opening, a roof for each auxiliary furnace having a portion which forms the upper margin of the corresponding outlet opening and slopes upwardly toward the main furnace so that the gases will flow upwardly as they enter the main furnace, two additional walls located adjacent the bridge wall and extending laterally from opposite sides of the rear portion of the battery wall and between the main furnace and the respective auxiliary furnaces to form one lateral margin of the respective outlet openings, each laterally extending wall being subjected on one side to the heat within the main furnace and on its opposite side to the heat within the corresponding auxiliary furnace and upright water tubes associated with each laterally extending wall and located adjacent the main furnace side of said wall to cool the same and shielded thereby from the heat within the corresponding auxiliary furnace.

4. A multiple furnace installation comprising a main furnace of considerable height arranged for the combustion of a high grade fuel in suspension, a relatively low auxiliary furnace having its walls connected to the lower portions of the walls of the main furnace and arranged for the combustion of a mass of low grade fuel, the auxiliary furnace having an outlet opening through which hot gases flow directly into the lower portion of the main furnace, a bridge wall located between the two furnaces and forming the lower margin of the outlet opening, refractory material forming a roof for the auxiliary furnace and having a portion which forms the upper margin of the outlet opening and slopes upwardly toward the main furnace so that the gases will flow upwardly as they enter the main furnace, a row of water tubes arranged to support and cool the roof and shielded by the refractory material thereof from the heat within the auxiliary furnace, the water tubes sloping upwardly and rearwardly above the outlet opening, an additional wall located adjacent the bridge wall and extending laterally between the two furnaces from one side wall of the auxiliary furnace toward the other side wall thereof to form one lateral margin of the outlet opening, the laterally extending wall being subjected on one side to the heat within the main furnace and on its opposite side to the heat within the auxiliary furnace, and upright water tubes associated with the laterally extending wall and located adjacent the main furnace side of said wall to cool the same and shielded thereby from the heat within the auxiliary furnace.

DALE BUMSTEAD, Jr.

REFERENCES CITED

The following references are of record in the file of this patent:

UNITED STATES PATENTS

| Number | Name | Date |
| --- | --- | --- |
| 1,878,524 | Johnson | Sept. 20, 1932 |
| 2,238,007 | Badenhausen | Apr. 8, 1941 |
| 2,239,341 | Rehm | Apr. 22, 1941 |
| 2,254,226 | Koch | Sept. 2, 1941 |
| 2,296,656 | Vicary | Sept. 22, 1942 |